United States Patent Office 2,711,405
Patented June 21, 1955

2,711,405
PREPARATION OF AZO COMPOUNDS

Arthur William Anderson, Verona, N. J., assignor to E. I. du Pont de Nemours & Company, Wilmington, Del., a corporation of Delaware No Drawing. Application April 5, 1949,
Serial No. 85,720

12 Claims. (Cl. 260—192)

This invention relates to the preparation of azo compounds and, more particularly, to the preparation of azo compounds useful as polymerization catalysts.

In the preparation of a great number of azo compounds particularly the type of azo compounds useful as polymerization catalysts disclosed in Hunt U. S. Patent 2,471,959 patented May 31, 1949, hydrazine and derivatives thereof have been used as raw materials. Since hydrazine is a relatively expensive raw material, use of this compound or derivatives thereof in the preparation of various azo compounds contributes substantially to the cost of the final product. The preparation of various azo compounds using hydrazine or derivatives thereof as a raw material is described in Thiele and Heuser, Ann. 290, 1–43 (1896); Hartmann, Rec. trav. chim. 46, 150–153 (1927); Chem. Weekblad., vol. 23, pages 77–78, January 1926; and Dox, J. Am. Chem. Soc. 47, 1471–1477, 1925.

An object of the present invention is to provide a new and improved process for the preparation of azo compounds wherein the azo, —N=N—, group is bonded from both of the nitrogens to different tertiary carbon atoms. A further object is to provide a new and improved process for the preparation of azo compounds useful as polymerization catalysts. A still further object is to provide a low cost process for producing azo compounds by using starting compounds other than hydrazine or derivatives thereof. Further objects will be apparent from the description of the invention given hereinafter.

The above objects are accomplished according to the present invention by dissolving an alpha-amino compound having the general formula

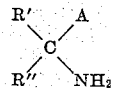

wherein A is a radical from the group consisting of —CN, —COOM, and —COOR, R being an alkyl radical and M an alkali metal or alkaline earth metal, and R' and R" are radicals from the group consisting of hydrocarbon and alkoxy hydrocarbon radicals, in an aqueous solution of a compound from the group consisting of the alkali metal and alkaline earth metal hypohalites, at a temperature below 10° C. and separating the reaction product formed from the solution. The radicals R' and R" may be two separate radicals or they may be combined to form a cyclic radical in which case R' and R", in a sense, represent only a single cyclic radical joined through two separate, discrete carbon atoms in the cyclic radical to the carbon atom which is joined to the NH₂ group. Hence, in the above general formula R' and R" include both separate radicals and, combined, a single cyclic radical. More specifically, where R' and R" are combined in a cyclic radical, the alpha-amino compounds of the general formula

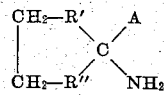

are preferred.

In a preferred form the alpha-amino compound used is one having the general formula

wherein A represents a radical from the group consisting of —CN, —COOM, and —COOR, R being an alkyl radical having 1 to 6 carbon atoms, inclusive, and M an alkali metal, and R' and R" are hydrocarbon radicals, preferably containing from 1 to 6 carbon atoms, inclusive. Also, it is preferred to carry out the reaction at a temperature between —20° C. and +10° C. and, even more specifically, between —10° C. and +5° C., and to use sodium hypochlorite.

The following example in which all parts are by weight unless otherwise specified, illustrates a specific embodiment of the present invention.

Example I

This example illustrates the preparation of alpha, alpha'-azodiisobutyronitrile from alpha-aminoisobutyronitrile.

The alpha-aminoisobutyronitrile was prepared in the following manner according to the general method described in Jacobson, J. A. C. S. 68, 2628 (1946):

One mole (85 grams) of acetone cyanhydrin and two moles of ammonia were mixed in a steel reaction vessel and were shaken together for four hours. The reaction vessel was placed in an ice bath to conduct the exothermic heat from the reaction. At the end of four hours excess ammonia was bled off and the remaining liquid was distilled under reduced pressure. The fraction boiling between 50 and 60° C. at 15–19 millimeters' pressure was alpha-aminoisobutyronitrile which amounted to 70% of the theoretical yield.

Three-tenths of a mole (12 grams) of sodium hydroxide dissolved in 60 cc. of water were poured into an Erlenmeyer flask. Chlorine was passed in at a temperature of about 0° C. until about 0.13 mole (8.8 grams) had been absorbed. Eight and four-tenths grams of the alpha-aminoisobutyronitrile was rapidly added to the hypochlorite solution thus formed which also contained 125 grams of crushed ice. The mixture which was maintained at a temperature of about —8° C. was agitated for about 8–10 minutes. The reaction resulted in the formation of a finely-divided, white, crystalline precipitate which was immediately removed by filtration, thoroughly washed with distilled water, air dried and vacuum dried. The yield of alpha, alpha'-azodiisobutyronitrile weighed 6.8 grams which is 85% of the theoretical yield. The product melted at 105–107° C.

The above reactions take place according to the following equations:

(1) $\quad Cl_2 + 2NaOH \longrightarrow NaOCl + NaCl + H_2O$ (2)
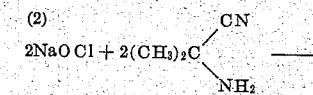

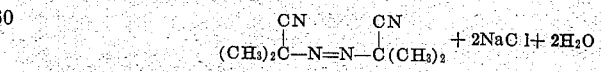

It will be understood that the above example is merely illustrative and the invention broadly comprises dissolving an alpha-amino compound of the type disclosed in an aqueous solution of an alkali metal or alkaline earth metal hypohalite at a temperature below 10° C. and separating the azo compound formed from the solution.

Other alpha-amino compounds of the type disclosed may be prepared by adaptations of the method described in Jacobson, J. A. C. S. 68, 2628 (1946), for example, alpha - amino - alpha - methyl - gamma - methylvaleronitrile; alpha-aminomethylisobutyrate; alpha-aminocyclohexanecarbonitrile; alpha - amino - alpha - methyl - gamma-methyl - gamma - methoxyvaleronitrile; and alpha-amino-alpha-phenylpropionitrile, which alpha - amino compounds may then, in accordance with the present invention, be dissolved in sodium hypohalite and the reaction carried out under conditions analogous to those in Example I to obtain alpha,alpha'-azobis (alpha,gamma-dimethylvaleronitrile); dimethyl alpha,alpha'-azodiisobutyrate; 1,1' azodicyclohexane-carbonitrile; alpha,-alpha'-azobis (alpha,gamma-dimethyl-gamma-methoxyvaleronitrile); and alpha,alpha'-azobis (alpha-phenylpropionitrile), respectively.

Proportions of the reactants are not critical although, in general, approximately stoichiometric proportions will be used as a matter of efficiency and economy. It has been found that a slight excess of the alkali metal or alkaline earth metal hydroxide over that required to react with the halogen used is of some advantage since the presence of excessive or free halogen tends to have a somewhat deleterious effect on the reaction. Also, an excess of the alkali metal or alkaline earth metal hypohalite over that required to react with the alpha-amino compound, is slightly preferred. Any type of reaction vessel may be used although it should be equipped with means for agitating the contents. A high speed rotary type of mixer is preferred.

The reaction is best carried out in the absence of contaminating elements such a various heavy metals, especially iron and copper, which tend to decompose the hypohalite solution. In the preparation of relatively low melting azo compounds, the reaction product will be in the form of an oily liquid rather than as a crystalline precipitate, so that it is necessary to isolate the azo compound by crystallization from a solvent solution. Where the azo compound is formed as a crystalline precipitate, it may readily be removed from the solution by filtering.

A condition of this invention is that the alpha-amino compound be dissolved in the hypohalite solution at a temperature below 10° C. At temperatures appreciably above 10° C., there may be some reaction and some azo compound formed but the reaction gives poor yields and it is not practical to operate above 10° C. There is no limit to the lower temperature except the mechanical one of avoiding trouble through freezing. It is hard to conceive any conditions warranting going below —40° C. and, practically, —20° C., is about the lower limit. It is preferred to carry out the reaction at a temperature between —10° C. and +5° C. The expedient of introducing crushed ice into the hypohalite solution to form an ice-hypohalite slurry is a convenient method of maintaining a desirable temperature. However, the reaction vessel may be surrounded externally by a low temperature medium.

Any alkali metal or alkaline earth metal hypohalite may be used in carrying out the present invention although the hypochlorites, being most economical and highly active in this reaction, are preferred. The hypobromites and hypoiodites are less preferred but operable. The metal salt of the hypochlorite may be any of those shown in the examples, i. e., sodium, potassium and calcium, or other such metals as lithium, strontium, or barium but sodium hypochlorite, the most economical hypohalite, is the preferred one as the reaction proceeds very rapidly when using it.

The alpha-amino compounds having the general formula

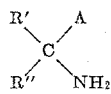

wherein A represents a radical from the group consisting of —CN, —COOM, and —COOR, R being an alkyl radical and M an alkali metal or an alkaline earth metal, and R' and R" are radicals from the group consisting of hydrocarbon radicals, including aliphatic, alicyclic, and aromatic hydrocarbon radicals, and alkoxy hydrocarbon radicals, may be prepared by adaptations of the methods described in the following references: Dubsky and Wensink, Ber. 49, 1134 (1916); Bucherer and Steiner, J. Prakt. Chem. 140, 308 (1934); and Jacobson, J. A. C. S. 67, 1996 (1945); as well as the above-mentioned Jacobson, J. A. C. S. 68, 2628 (1946).

The azo compounds prepared in accordance with the method of the present invention are those wherein the azo, —N=N—, group is bonded from both of the nitrogens to different tertiary carbon atoms from the group consisting of aliphatic and cycloaliphatic carbon atoms, both of said different carbon atoms being tertiary and one of the carbon atoms bonded to each of said tertiary carbon atoms having its remaining valences satisfied only by elements of the class consisting of oxygen and nitrogen. Among these azo compounds in addition to those already mentioned are alpha,alpha'-azobis (alpha-methylbutyronitrile); alpha,alpha'-azobis (alpha-ethylbutyronitrile); alpha,alpha'-azobis (alpha-cyclopropyl-propionitrile); alpha,alpha'-azobis (alpha-cyclohexyl-propionitrile); alpha,alpha'-azobis (alpha-cycloheptylpropionitrile; alpha,alpha'-azobis (alpha-isopropyl-beta-methylbutyronitrile); alpha,alpha'-azobis (alpha,gamma-dimethylcapronitrile); alpha,alpha'-azobis (alpha-n-butylcapronitrile); alpha,alpha'-azobis (alpha-isobutyl-gamma-methylvaleronitrile); 1,1'-azodicycloheptanecarbonitrile, and the corresponding esters of the above in which the nitrile groups are replaced by ester groups, e. g., dimethyl, diethyl and dihexyl alpha,alpha'-azodiisobutyrate, and the corresponding compounds in which the nitrile group is replaced by —COOM, M being an alkali metal or alkaline earth metal.

The concentration of the aqueous hypohalite solution is not critical although the use of a concentrated solution is more convenient and economical to handle. That is, the reaction can be carried out using dilute solutions but the greater volume of liquids necessarily involves larger equipment and general inconvenience. There should be sufficient liquid present to facilitate removal of the reaction product but such quantity of liquid is inherently present in any aqueous solution of these hypohalites.

The formation of the herein considered azo compounds depends on the alpha-amino compound dissolving in the aqueous hypohalite solution. Most of the alpha-amino compounds coming within the scope of this invention will immediately dissolve in the hypohalite solution. However, some alpha-amino compounds are only sparingly soluble in the hypohalite solution; this involves no practical difficulty in carrying out the process as the alpha-amino compound will progressively dissolve in the hypohalite solution as the azo compound is formed and precipitated. It will merely require a longer period to dissolve all the alpha-amino compound if it is of limited solubility in the hypohalite solution.

The outstanding advantage of the present invention is that it provides such a simple and economical process of preparing these azo compounds as compared to the prior art process of preparing these azo compounds from hydrazines. Not only are the alpha-amino compounds a relatively cheap raw material compared to the hydrazines but the yields obtained are very high and the procedural steps are readily carried out.

As many apparently widely different embodiments of this invention may be made without departing from the spirit and scope thereof, it is to be understood that the invention is not limited to the specific embodiments thereof except as defined in the appended claims.

I claim:

1. Process of preparing azo compounds wherein the azo, —N=N—, group is bonded from both the nitrogens to different tertiary C atoms each of which has bonded thereto one cyano, —CN, group, which process comprises dissolving an alpha-amino compound having the general formula

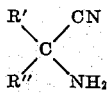

wherein R' and R" are radicals from the group consisting of hydrocarbon and alkoxy hydrocarbon radicals, in an aqueous solution of a compound from the group consisting of the alkali metal and alkaline earth metal hypohalites, at a temperature below $+10°$ C. and separating the reaction product formed from said solution.

2. Process as set forth in claim 1 wherein R' and R" are hydrocarbon radicals.

3. Process as set forth in claim 1 wherein R is an alkyl radical containing from 1 to 6 carbon atoms, inclusive, and R' and R" are hydrocarbon radicals containing from 1 to 6 carbon atoms, inclusive.

4. Process as set forth in claim 1 wherein said alpha-amino compound is alpha-aminoisobutyronitrile.

5. Process as set forth in claim 1 wherein said alpha-amino compound is dissolved in an aqueous solution of an alkali metal hypochlorite.

6. Process as set forth in claim 1 wherein said alpha-amino compound is dissolved in an aqueous solution of an alkali metal hypochlorite at a temperature between $-20°$ C. and $+10°$ C.

7. Process as set forth in claim 6 wherein said temperature is between $-10°$ C. and $+5°$ C.

8. Process of preparing alpha,alpha'-azodiisobutyronitrile which comprises dissolving alpha,aminoisobutyronitrile in an aqueous solution of an alkali metal hypochlorite at a temperature between $-20°$ C. and $+10°$ C. and separating the crystalline precipitate formed from said solution.

9. Process of preparing alpha,alpha'-azodiisobutyronitrile which comprises dissolving alpha-aminoisobutyronitrile in an aqueous solution of sodium hypochlorite at a temperature between $-10°$ C. to $+5°$ C. and separating the crystalline precipitate formed from said solution.

10. Process of preparing alpha,alpha'-azodiisobutyronitrile which comprises reacting alpha-aminoisobutyronitrile in an aqueous solution with sodium hypochlorite at a temperature of about $0°$ C.

11. Process of preparing alpha,alpha'-azodiisobutyronitrile which comprises reacting alpha-aminoisobutyronitrile in an aqueous solution with a hypochlorite selected from the group consisting of alkali metal and alkaline earth metal hypochlorites at a temperature of about $0°$ C.

12. Process of preparing alpha,alpha'-azodiisobutyronitrile which comprises reacting alpha-aminoisobutyronitrile in an aqueous solution with a hypochlorite selected from the group consisting of alkali metal and alkaline earth metal hypochlorites at a temperature between $-20°$ C and $+10°$ C.

References Cited in the file of this patent
UNITED STATES PATENTS
2,471,959    Hunt _____ May 21, 1949
OTHER REFERENCES
Lieben et al.: Chemical Abstracts, v. 27, 1933, page 4259.